United States Patent [19]

Reasoner

[11] Patent Number: 5,317,935
[45] Date of Patent: Jun. 7, 1994

[54] PARKLOCK ASSEMBLY HAVING A TERMINAL RETAINER

[75] Inventor: Michael V. Reasoner, Davison, Mich.

[73] Assignee: Teleflex Incorporated, Limerick, Pa.

[21] Appl. No.: 26,542

[22] Filed: Mar. 4, 1993

[51] Int. Cl.$^5$ .............................................. F16C 1/10
[52] U.S. Cl. ............................. 74/502.6; 74/501.5 R;
74/502.4; 74/500.5
[58] Field of Search ............... 74/500.5, 501.5 R, 502,
74/502.4, 502.6, 503

[56] References Cited

U.S. PATENT DOCUMENTS

| | | | |
|---|---|---|---|
| 4,712,397 | 12/1987 | Niskanen | 70/248 |
| 4,838,110 | 6/1989 | Koukal et al. | 74/502.6 |
| 4,852,425 | 8/1989 | Stocker | 74/586 |
| 4,881,423 | 11/1989 | Troiano | 74/501.6 |
| 4,936,161 | 6/1990 | Polando | 74/502.6 |
| 5,002,315 | 3/1991 | Bartholomew | 74/502.4 |
| 5,039,138 | 8/1991 | Dickirson | 74/502.6 |
| 5,161,426 | 11/1992 | Marshall | 74/502.4 |
| 5,163,338 | 11/1992 | Sharp et al. | 74/502.6 |
| 5,178,034 | 1/1993 | Reasoner | 74/502.6 |
| 5,199,321 | 4/1993 | Nowak | 74/502.6 |
| 5,207,116 | 5/1993 | Sultze | 74/502.4 |

Primary Examiner—Vinh T. Luong
Attorney, Agent, or Firm—Reising, Ethington, Barnard, Perry & Milton

[57] ABSTRACT

A remote control cable assembly (10) for transmitting motion in a curved path comprises a motion transmitting core element (12) and a conduit (14) slidably supporting the core element. There is also a terminal (16) disposed on one end of the core element (12) for transmitting axial reciprocating motion from the core element to an element to be controlled. The terminal (16) telescopes within a housing (44) disposed on the end of the conduit (14). The housing (44) includes a flexible tang or hook (28) for biasing from a non-limiting position in which the terminal (16) can be telescopingly inserted into the housing (44), to a limiting position after the terminal has been inserted into the housing so that the tang retains the terminal within the housing during shipping of the assembly (10).

20 Claims, 2 Drawing Sheets

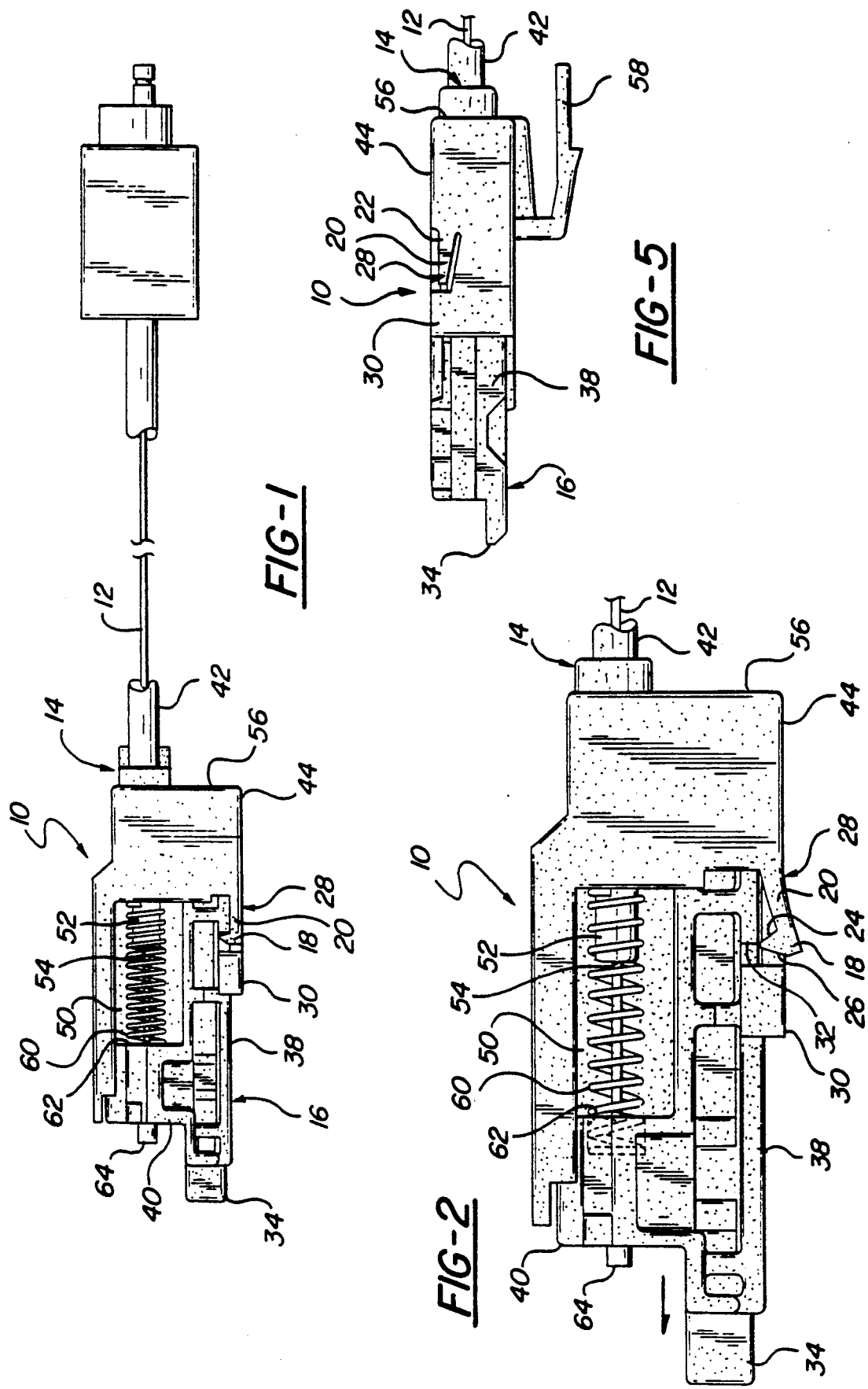

5,317,935

PARKLOCK ASSEMBLY HAVING A TERMINAL RETAINER

TECHNICAL FIELD

The subject invention relates to motion transmitting remote control cable assemblies of the type for transmitting motion in a curved path by a flexible motion transmitting core element.

BACKGROUND OF THE INVENTION

Parklock cable assemblies generally include a motion transmitting core element disposed within a conduit. One end of the core element extends from one end of the conduit, while the other end has a terminal attached which extends out of the other end of the conduit. Actually, the terminal extends out of a flared terminal housing which is attached on the end of the conduit. A spring is disposed between the terminal and the housing to bias the terminal out of the housing. It is desirable when shipping the assembly to retain the terminal within the housing against the biasing force of the spring. Hitherto this has been accomplished by disposing a shipping slug on the end of the core element opposite the end having the terminal. This slug prevents the core element from being pulled through the conduit and effectively limits the extent to which the terminal on the other end may extend out of the housing. However, this arrangement is not completely satisfactory because it involves additional cost for the shipping slug itself, and for the labor involved in putting the shipping slug on the core element before shipping and removing the shipping slug just prior to installing the assembly in a vehicle.

SUMMARY OF THE INVENTION AND ADVANTAGES

A motion transmitting remote control cable assembly for transmitting motion in a curved path comprises a motion transmitting core element, a conduit slidably supporting the core element as the core element reciprocates axially within the conduit and a terminal disposed on one end of the core element and in telescoping relationship within the conduit for transmitting axial reciprocating motion from the core element to an element to be controlled. The assembly also includes limiting means for limiting the extent to which the terminal may reciprocate axially within the conduit. The assembly is characterized by including biasing means for biasing the limiting means from a non-limiting position in which the terminal can be telescopingly inserted into the conduit to a limiting position after the terminal has been inserted into the conduit in which the limiting means limits the extent to which the terminal may reciprocate axially within the conduit.

With this arrangement, the terminal can be inserted into the terminal housing because the biasing means will flex into a non-limiting position. Once the terminal is inserted, the biasing means biases the limiting means into a limiting position in which the terminal will be effectively retained in the housing during shipping.

The biasing means and the limiting means can be molded as part of the terminal housing with little or no additional cost, and they need not be installed before shipping or removed afterwards. Thus, the additional labor required in the case of the shipping slug is not necessary.

FIGURES IN THE DRAWINGS

Other advantages of the present invention will be readily appreciated as the same becomes better understood by reference to the following detailed description when considered in connection with the accompanying drawings wherein:

FIG. 1 is a side view of the subject invention showing the terminal within the terminal housing and the limiting means in the limiting position;

FIG. 2 is a side view of the subject invention showing the terminal within the terminal housing and the limiting means in the non-limiting position;

FIG. 5 is a top view of the subject invention showing the biasing means.

DETAILED DESCRIPTION OF THE PREFERRED EMBODIMENT

Figure 3:
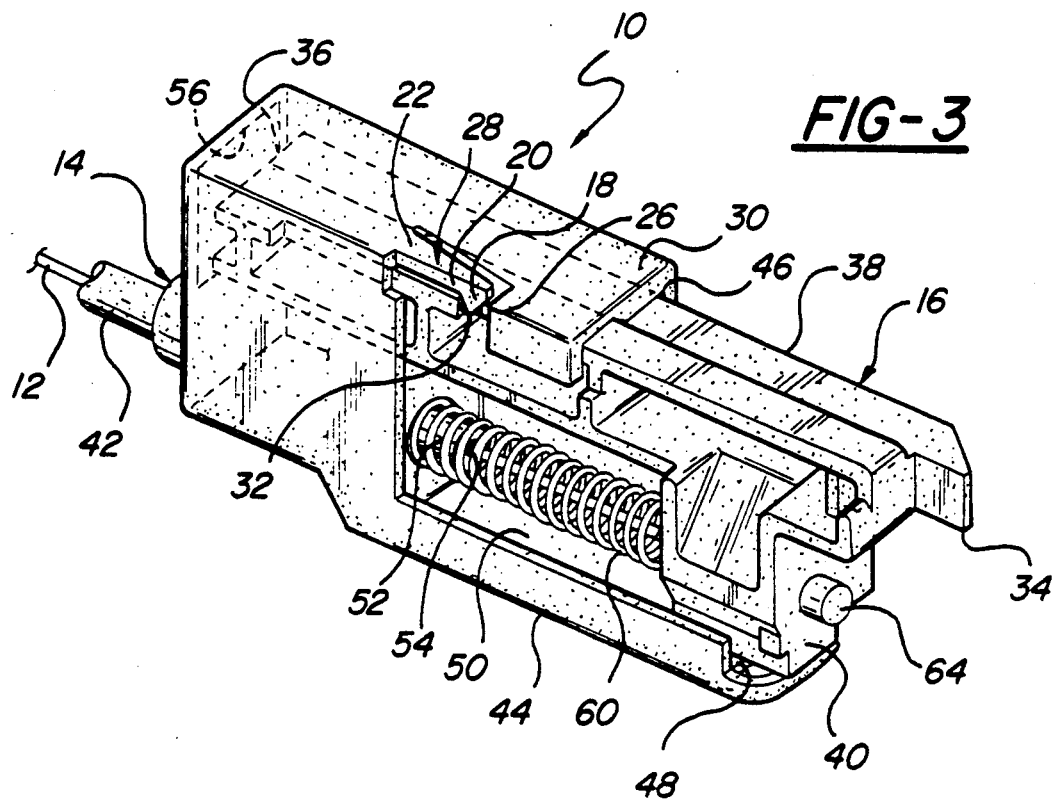
FIG. 3 is a perspective view of the subject invention showing the top and side of the biasing means and the limiting means in the limiting position.
Figure 4:
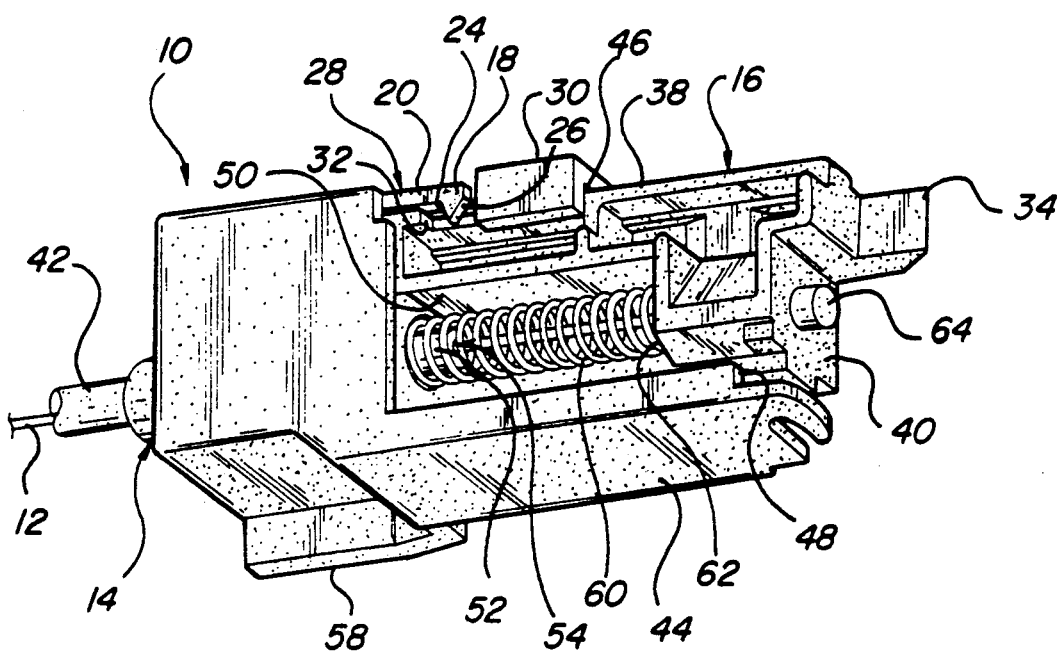
FIG. 4 is a perspective view of the subject invention showing the bottom and side of the biasing means and the limiting means in the limiting position.

Referring to the figures wherein like numerals indicate like or corresponding parts throughout the several views, a motion transmitting remote control cable assembly is generally shown at 10. The assembly 10 comprises a motion transmitting core element 12, a conduit generally indicated at 14 slidably supporting the core element 12 as the core element reciprocates axially within the conduit and a terminal generally indicated at 16 disposed on one end of the core element and in telescoping relationship within the conduit 14 for transmitting axial reciprocating motion from the core element 12 to an element to be controlled (not shown). The assembly also includes limiting means 18 for limiting the extent to which the terminal 16 may reciprocate axially within the conduit 14. The assembly is characterized by including biasing means 20 for biasing the limiting means 18 from a non-limiting position (see FIG. 2) in which the terminal 16 can be telescopingly inserted into the conduit 14 to a limiting position (see FIGS. 1, 3 and 4) after the terminal 16 has been inserted into the conduit in which the limiting means 18 limits the extent to which the terminal 16 may reciprocate axially within the conduit.

The subject invention provides an inexpensive and simple way to retain the terminal 16 within the conduit 14 during shipping. The invention serves no purpose after the assembly 10 is attached to its operating position on a vehicle.

The conduit 14 includes a casing portion 42 supporting the core element 12 and a flared terminal housing 44 disposed on an end of the casing supporting the core element and the terminal 16. The casing 42 is any typical conduit of the type used in supporting motion transmitting core elements.

The biasing means 20 is a flexible finger with a base end 22 and a distal end, where the finger attaches at the base end to the housing 44 and extends in the limiting position parallel to the terminal's path of reciprocation. The finger 20 is thicker at the base end 22 than at the distal end for added strength. The finger 20 may also be thought of as a flexible shaft which allows the limiting means 18 to flex into a non-limiting position with respect to the terminal 16 to enable the terminal to be inserted into the housing 44.

The limiting means 18 includes a head disposed on the distal end of the finger 20 and extending in the limiting position radially inward from the conduit 14 toward the terminal 16. The head 18 presents a flange surface 24 generally perpendicular to the terminal's path of reciprocation. The flange surface 24 is not perfectly perpendicular, though: it angles slightly back toward the base of the finger 20. The flange surface 24 may be said to be on a rear side of the head 18. The head 18 also has an oppositely disposed front side 26 which is slightly angled as shown in the figures. The finger 20 and the head 18 together form a tang or hook generally indicated at 28 which is molded as a part of the housing 44. The flange surface 24 and the front side 26 are angled to allow the housing 44 to be removed easily from the mold in which the housing is formed. As one skilled in the art will appreciate, if these surfaces were not angled slightly, the mold may deform or break the finger 20 or the head 18 when the housing 44 is separated from the mold. The angling of these faces 24,26 allows the finger 20 to flex to provide separation clearance for the mold to part from the housing 44. The tang 28 is spaced back from the distal end of the conduit 14, thereby leaving a support portion 30 of the housing 44 to provide support to the terminal 16 and help prevent it from moving other than in the predetermined axial direction.

The terminal 16 includes a corresponding abutment surface 32 extending generally perpendicular to the terminal's path of reciprocation whereby the abutment surface 32 engages the flange surface 24 when the terminal 16 moves a predetermined axial distance with respect to the conduit 14. The terminal 16 has a forward end 34 for contacting the element to be controlled and an oppositely disposed rear end 36. The abutment surface 32 is disposed adjacent the rear end 36 of the terminal 16 for allowing the terminal to move a predetermined axial distance with respect to the housing 44 before the flange surface 24 engages the abutment surface 32 and limits further movement of the terminal 16 with respect to the housing 44. The abutment surface 32 may be placed in a number of locations along the terminal 16 to allow for the desired amount of reciprocating movement. In other words, the extent to which the terminal 16 may move with respect to the housing 44 depends on where the abutment surface 32 and the tang 28 are placed.

Much of the rest of the assembly 10 is known in the prior art, including that disclosed by the assignee of the subject invention. Particularly pertinent is U S. Pat. No. 4,712,397 to Niskanen, the teachings of which are incorporated herein by reference. The terminal 16 includes a spine portion 38 having a forward end and rear end coincident with the forward and rear ends, respectively, of the terminal 16, and a guide portion 40 extending normally away from the spine portion 38 adjacent the front end whereby the terminal 16 is substantially "L" shaped. The housing 44 includes first and second oppositely disposed linear channels 46,48 defining a guide track for guiding the terminal 16. The spine portion 38 of the terminal 16 is disposed in the first channel 46 and the guide portion 40 extends across the housing 44 and into the second channel 48. Said another way, the channels 46,48 in the housing 44 form a track in which the terminal 16 may slide back and forth. The housing and the terminal 16 define a spring space 50. The housing 44 further includes a spring seat 52 extending into the spring space 50 parallel to the spine portion 38 and toward the guide portion 40. The spring seat 52 defines a core opening 54 for slidably supporting the core element 12. The housing 44 defines a terminal opening 56 providing clearance for the rear end of the terminal 16 when the terminal is forced into the housing. The housing 44 finally includes a clip 58 for clipping the housing to a support structure (not shown). The support structure in this case is part of the steering column of a vehicle.

The assembly also includes a helical spring 60 disposed in the spring space 50 over the spring seat 52 and abutting the guide portion 40 of the terminal 16 to bias the terminal in one axial direction with respect to the conduit 14. The guide portion 40 of the terminal 16 defines a cylindrical space 62 for receiving the spring 60.

The core element 12 extends through the core opening 54, through the spring 60 and through the guide portion 40 of the terminal 16. The core element 12 includes a slug 64 disposed on its distal end for preventing the core element from being pulled back through the guide portion 40 of the terminal whereby the core element 12 may pull the terminal 16 in one axial direction with respect to the housing 44 along the track against the biasing force of the spring.

The parts of the assembly, except for the core element 12 and the spring 60, are generally made from hard plastic material, though other materials can be used.

The invention has been described in an illustrative manner, and it is to be understood that the terminology which has been used is intended to be in the nature of words of description rather than of limitation.

Obviously, many modifications and variations of the present invention are possible in light of the above teachings. Therefore, it is to be understood that within the scope of the appended claims, wherein reference numerals are merely for convenience and are not to be in any way limiting, the invention may be practiced otherwise than as specifically described.

We claim:

1. A motion transmitting remote control cable assembly (10) for transmitting motion in a curved path comprising:

a motion transmitting core element (12);

a conduit (14) slidably supporting said core element (12) as said core element reciprocates axially within said conduit;

a terminal (16) disposed on one end of said core element (12) and in telescoping relationship within said conduit (14);

spring means (60) interposed between said conduit (14) and said terminal for urging said terminal out of said conduit and placing said core element (12) in tension;

limiting means (18) for limiting the extent to which said terminal (16) is urged by said spring means out of said conduit (14); and biasing means (20) for biasing said limiting means from a non-limiting position in which said terminal (16) is telescopingly inserted into said conduit (14) to a limiting position after said terminal has been inserted into said conduit in which said limiting means limits the extent to which said terminal is urged out of said conduit (14).

2. An assembly (10) as set forth in claim 1 wherein said biasing means (20) includes a flexible finger with a base end (22) and a distal end, said finger (20) being attached at said base end (22) to said conduit (14) and extending in said limiting position parallel to said terminal.

3. An assembly (10) as set forth in claim 2 wherein said limiting means (18) includes a head disposed on said distal end of said finger (20) and extending in said limiting position radially inward from said conduit (14) toward said terminal (16).

4. An assembly (10) as set forth in claim 3 wherein said head (18) presents a flange surface (24) generally perpendicular to said terminal.

5. An assembly (10) as set forth in claim 4 wherein said terminal (16) defines an abutment surface (32) extending generally perpendicular to said terminal's path of reciprocation whereby said abutment surface (32) engages said flange surface (24) when said terminal (16) moves a predetermined axial distance with respect to said conduit (14).

6. An assembly (10) as set forth in claim 5 wherein said terminal (16) has a forward end (34) for contacting the element to be controlled and an oppositely disposed rear end (36), said abutment surface (32) being disposed adjacent said rear end of said terminal for allowing said terminal to move a predetermined axial distance with respect to said conduit (14) before said flange surface (24) engages said abutment surface and limits further movement of said terminal (16) with respect to said conduit (14).

7. An assembly (10) as set forth in claim 2 wherein said finger (20) is thicker at said base end (22) than at said distal end.

8. An assembly (10) as set forth in claim 6 wherein said terminal (16) includes a spine portion (38) having a forward end and rear end coincident with said forward and rear ends (34,36), respectively of said terminal (16) and a guide portion (40) extending normally away from said spine portion adjacent said front end whereby said terminal is substantially "L" shaped.

9. An assembly (10) as set forth in claim 8 wherein said conduit (14) includes a casing portion (42) supporting said core element (12) and a flared terminal housing (44) disposed on an end of said casing (42) supporting said core element and said terminal (16).

10. An assembly (10) as set forth in claim 9 wherein said housing (44) includes first and second oppositely disposed linear channels (46,48) defining a guide track for guiding said terminal (16).

11. An assembly (10) as set forth in claim 10 wherein said spine portion (38) is disposed in said first channel (46) and said guide portion (40) extending across said housing (44) and into said second channel (48) whereby said housing (44) and said terminal (16) define a spring space (50).

12. An assembly (10) as set forth in claim 11 wherein said housing (44) includes a spring seat (52) extending into said spring space (50) parallel to said spine portion (38) and toward said guide portion (40).

13. An assembly (10) as set forth in claim 12 including a spring (60) disposed in said spring space (50) over said spring seat (52) and abutting said guide portion (40) of said terminal (16) to bias said terminal in one axial direction with respect to said conduit (14).

14. An assembly (10) as set forth in claim 13 wherein said spring seat (52) defines a core opening (54) for slidably supporting said core element (12).

15. An assembly (10) as set forth in claim 14 wherein said spring (60) is a helical spring.

16. An assembly (10) as set forth in claim 15 wherein said guide portion (40) defines a cylindrical space (62) for receiving said spring (60).

17. An assembly (10) as set forth in claim 16 wherein said flange surface (24) is angled slightly to form an obtuse angle with said finger (20).

18. An assembly (10) as set forth in claim 17 wherein said core element (12) includes a slug (64) disposed on its distal end for preventing said core element (12) from being pulled back through said guide portion (40) of said terminal (16) whereby said core element may pull said terminal (16) in one axial direction with respect to said housing (44) along said track (46, 48) against the biasing force of said spring (60).

19. An assembly (10) as set forth in claim 17 wherein said head (18) includes a front side (26) oppositely disposed from said flange surface (24), said front side (26) being angled slightly to form an acute angle with said finger (20).

20. An assembly (10) as set forth in claim 9 wherein said housing (44) includes a clip (58) for clipping said housing to a support structure.

* * * * *